US006161835A

United States Patent [19]

Arbuckle

[11] Patent Number: 6,161,835

[45] Date of Patent: Dec. 19, 2000

[54] INTEGRATED BARRIER FLUID SEALING APPARATUS WITH VISUAL VOLUME INDICATOR

[76] Inventor: Donald P. Arbuckle, 4483 S. Vrain St., Denver, Colo. 80236

[21] Appl. No.: 09/375,313

[22] Filed: Aug. 16, 1999

Related U.S. Application Data

[60] Provisional application No. 60/096,738, Aug. 17, 1998, and provisional application No. 60/096,877, Aug. 17, 1998.

[51] Int. Cl.[7] .................................................... F16J 15/56

[52] U.S. Cl. ........................................ 277/320; 277/431

[58] Field of Search .................................. 277/304, 317, 277/318, 319, 320, 431, 432; 73/290 R; 33/DIG. 15; 116/208, 228, 272, 283, 321, 323, 324, DIG. 21

[56] References Cited

U.S. PATENT DOCUMENTS

| | | | |
|---|---|---|---|
| 1,447,824 | 3/1923 | Thompson . | |
| 1,636,752 | 7/1927 | Mitchell . | |
| 1,721,737 | 7/1929 | Joyce . | |
| 3,176,996 | 4/1965 | Barnett . | |
| 3,259,390 | 7/1966 | Sanford . | |
| 3,266,722 | 8/1966 | Hobbis . | |
| 3,297,329 | 1/1967 | Smith et al. . | |
| 3,589,737 | 6/1971 | Sedy . | |
| 3,749,411 | 7/1973 | Lennon . | |
| 3,831,381 | 8/1974 | Swearingen | 60/657 |
| 3,887,195 | 6/1975 | Vincigverra . | |
| 3,888,495 | 6/1975 | Mayer . | |
| 3,987,663 | 10/1976 | Repella . | |
| 3,994,503 | 11/1976 | Dousse et al. . | |
| 4,014,555 | 3/1977 | Jacottet . | |
| 4,114,058 | 9/1978 | Albaric | 310/54 |
| 4,206,928 | 6/1980 | Asano . | |
| 4,408,766 | 10/1983 | Paech . | |
| 4,412,447 | 11/1983 | McMahan . | |
| 4,505,115 | 3/1985 | Arbuckle | 60/562 |
| 4,510,792 | 4/1985 | Morec et al. | 73/40.7 |
| 4,858,937 | 8/1989 | Fairlie-Clarke et al. . | |
| 4,922,719 | 5/1990 | Arbuckle | 60/562 |
| 5,031,509 | 7/1991 | Cowan | 92/86 |
| 5,067,874 | 11/1991 | Foote | 415/230 |
| 5,186,277 | 2/1993 | Snuttjer et al. | 184/6.22 |
| 5,209,495 | 5/1993 | Palmour . | |
| 5,226,509 | 7/1993 | Smith . | |
| 5,244,183 | 9/1993 | Calvin et al. | 251/214 |
| 5,249,812 | 10/1993 | Volden et al. . | |
| 5,267,736 | 12/1993 | Pietsch et al. . | |
| 5,345,829 | 9/1994 | Yamauchi et al. | 73/865.9 |
| 5,474,303 | 12/1995 | Coles . | |
| 5,502,435 | 3/1996 | Ralston | 340/632 |
| 5,535,136 | 7/1996 | Standifer | 364/510 |
| 5,636,847 | 6/1997 | Ostrowski . | |
| 5,746,435 | 5/1998 | Arbuckle . | |
| 5,906,374 | 5/1999 | Arbuckle | 277/304 |

*Primary Examiner*—Anthony Knight
*Assistant Examiner*—John L. Beres

[57] ABSTRACT

An integrated barrier fluid sealing apparatus includes an annular pressure intensifier surrounding a shaft of an operational device and defining a chamber extending around and along the shaft and containing a barrier fluid. The integrated apparatus also includes an annular sealing arrangement mounted to the pressure intensifier and surrounding the shaft so as to provide a seal around the shaft such that the pressure intensifier and sealing arrangement cooperate to prevent leakage of process fluid along the shaft to an external environment. A visual barrier fluid volume indicator mechanism also is provided which cooperates with operation of the pressure intensifier to visually indicate the volume of barrier fluid in the chamber of the pressure intensifier.

16 Claims, 7 Drawing Sheets

HOST COMPUTER (REMOTE LOCATION)
REPORTING NETWORK
MICRO-COMPUTER (DEVICE LOCATION)
VOLUME INPUT
TEMPERATURE INPUT
BARRIER FLUID SUPPLY CONTROL OUTPUT
RESERVOIR LEVEL INDICATOR
POWER SUPPLY
PUMP CONTROL CONNECTOR
POWER CONNECTOR
LEVEL INDICATOR CONNECTOR
NON SPILL QUICK COUPLING
ELEC. MOTOR
SOLID STATE RELAY
PUMP
STRAINER
92
90
86
80
56
10
24
12
B
P
16
20
18
14
74
88
78
76
94
96

INTEGRATED BARRIER FLUID SEALING APPARATUS WITH VISUAL VOLUME INDICATOR

This patent application claims the benefit of U.S. provisional application Nos. 60/096,738 and 60/096,877, both filed Aug. 17, 1998.

TECHNICAL FIELD

The present invention generally relates to prevention of leakage of process fluid through seals and monitoring of seals for leakage and, more particularly, is concerned with an integrated barrier fluid sealing apparatus employed in an operational device, such as a valve, pump or the like, along with a visual barrier fluid volume indicator mechanism.

BACKGROUND ART

Valves and the like used in the petroleum and chemical industry commonly are used to control the flow of hazardous and toxic chemicals. Since the chemicals that these valves contain can be dangerous, it is important that leakage or emissions from around the valve stems be prevented and the valve stems be continually monitored.

Engineers from the petroleum and chemical process industry, along with representatives from the EPA, have worked jointly to develop design guidelines for seals to control such emissions. One such guideline requires the use of dual mechanical seals with a pressurized non-volatile benign barrier fluid between the seals. The pressure of the barrier fluid is regulated to ensure a correct pressure range relative to the process fluid pressure to prevent leakage to the external environment, and the system is monitored to detect leakage from the seals.

U.S. Pat. Nos. 5,746,435 and 5,906,374 have been granted to the inventor herein disclosing a dual seal barrier fluid leakage control apparatus employing a pressure intensifier and other components carrying out operations that address these problems. However, a drawback of this control apparatus is that, for certain operating conditions, it is too costly and large in size to be a practical solution. It also provides only an electronic measurement of the volume of barrier fluid.

Consequently, there is a continuing need for further innovations that will overcome these drawbacks.

DISCLOSURE OF INVENTION

The present invention provides an integrated barrier fluid sealing apparatus with a visual volume indicator mechanism designed to satisfy the aforementioned need. Unlike the control apparatus of the aforecited U.S. patents, the integrated apparatus of the present invention employs a pressure intensifier incorporated directly on the shaft of an operational device where fluid leakage is to be prevented and monitored. The integrated apparatus of the present invention is less costly and smaller in size than the previous control apparatus and also provides a mechanism for the visual indication of barrier fluid volume.

Accordingly, the present invention is directed to an integrated barrier fluid sealing apparatus comprising: (a) an elongated shaft of an operational device, the shaft having a first portion in communication with a process fluid at a first pressure and a second portion axially displaced from the first portion in communication with an external environment; (b) a pressure intensifier having an annular shape so as to surround and extend along the shaft, the pressure intensifier defining a chamber extending about the shaft between the process fluid and the external environment and containing barrier fluid therein, the pressure intensifier having an annular piston surrounding and movable relative to the shaft and disposed in the chamber in communication with the process fluid and barrier fluid for enabling the maintenance of the barrier fluid in the chamber at a second pressure above the first pressure of the process fluid; and (c) a sealing arrangement having an annular shape and mounted to the annular piston and surrounding the shaft so as to define a seal between the shaft and piston such that the pressure intensifier and sealing arrangement cooperate to prevent leakage of process fluid along the shaft to the external environment. The integrated apparatus also comprises a visual barrier fluid volume indicator mechanism coupled to the piston and being responsive to movement of the piston for visually indicating the volume of barrier fluid contained in the chamber.

The present invention further is directed to a barrier fluid sealing apparatus having a visual barrier fluid volume indicator mechanism associated with a piston of a pressure intensifier of the apparatus. The visual indicator mechanism comprises: (a) a stationary member with a visual measurement scale having a plurality of symbols thereon ranging from full to empty; and (b) an indicator member movable with the piston of the pressure intensifier such that the indicator member moves relative to the stationary member so as to align with one of the symbols on the scale that corresponds to the volume of barrier fluid contained in the chamber of the pressure intensifier.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

BEST MODE FOR CARRYING OUT THE INVENTION

Figure 1:
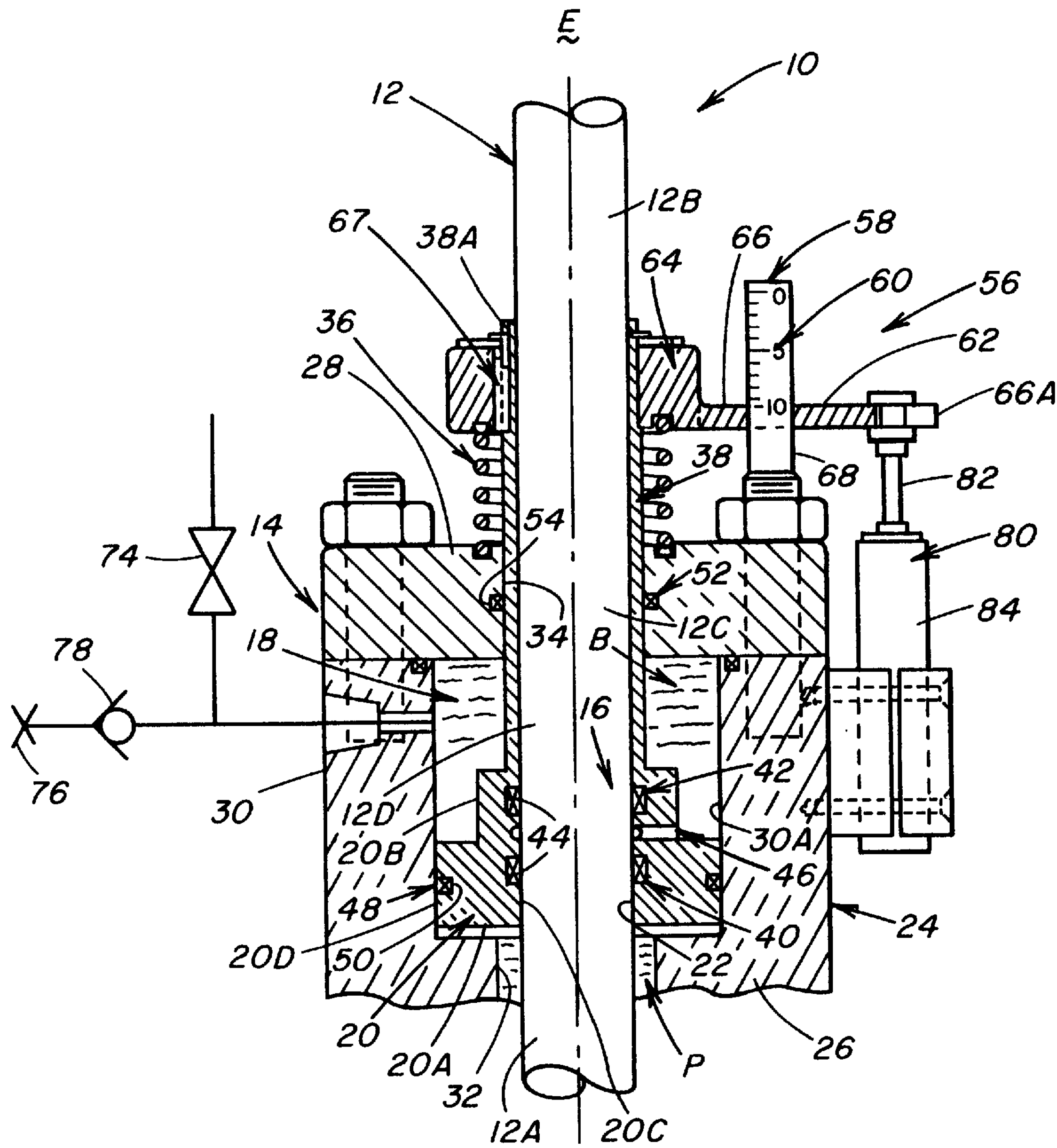
FIG. 1 is a longitudinal sectional view of a first exemplary embodiment of an integrated barrier fluid sealing apparatus of the present invention with a visual barrier fluid volume indicator mechanism, the integrated apparatus shown employing an exterior compression spring.

Referring to the drawings, and particularly to FIGS. 1 to 6, there is illustrated an integrated barrier fluid sealing apparatus of the present invention, generally designated 10. The integrated apparatus 10 includes an elongated shaft 12 of an operational device subject to fluid leakage, such as a valve, pump or the like, where the use of a barrier fluid B in preventing leakage of a process fluid P and where the monitoring for leakage are desired. The shaft 12, which can be a rotatable or reciprocable component of the operational device, has a first portion 12A disposed in communication with the process fluid P which is at a first pressure and a second portion 12B axially displaced from the first portion 12A of the shaft 12 and disposed in communication with an external environment E, such as the ambient atmosphere.

Referring now to FIGS. 1 to 4, in addition to the shaft 12 the integrated apparatus 10 basically includes a pressure intensifier 14 and a sealing arrangement 16. The pressure intensifier 14 of the apparatus 10 has an annular shape so as to surround and extend along the shaft 12. The annular-shaped pressure intensifier 14 defines an annular chamber 18 about the shaft 12 between the process fluid P and the external environment E. The chamber 18 contains the barrier fluid B therein. The pressure intensifier 14 also has an annular-shaped piston 20 which surrounds and is movable relative to the shaft 12. The piston 20 is disposed in the chamber 18 in communication with the process fluid P at an outer end 20A of the piston 20 and with the barrier fluid B at an inner end 20B of the piston 20 for enabling the maintenance of the barrier fluid B contained in the chamber 18 at a second pressure above the first pressure of the process fluid P. The sealing arrangement 16 of the apparatus 10 has an annular shape and is mounted to an inner peripheral surface 20C of the annular piston 20 within a central bore 22 defined by the inner peripheral surface 12C through the piston 10 and surrounds and engages the shaft 12 so as to define a seal, and preferably a dual seal, between an external cylindrical surface 12C of the shaft 12 and the inner peripheral surface 20C of the piston 20 which prevents leakage of the process fluid P along the shaft 12 to the external environment E.

More particularly, the pressure intensifier 14 includes a housing or enclosure 24 stationarily supported relative to the shaft 12 which enclosure 24 can be part of a casing (not shown) of the operational device, for example part of a bonnet of a valve. The enclosure 24 has a pair of opposite spaced apart end walls 26, 28 and an annular sidewall 30 extending between and connected with the opposite end walls 26, 28 so as to define the chamber 18 containing the barrier fluid B within the enclosure 24. The enclosure 24 also has a pair of opposite openings 32, 34 each formed through a respective one of the opposite end walls 26, 28. The piston 20 is disposed within the chamber 18 adjacent the one end wall 26 of the enclosure 24 and the one opening 32 thereof and surrounds and is slidably movable along and relative to the shaft 12. The shaft 12 thus has a third portion 12D extending through and beyond the piston 20, the chamber 18 and the openings 32, 34 of the end walls 26, 28 of the enclosure 24 which interconnects the first and second portions 12A, 12B of the shaft 12. The chamber 18 has the annular shape and extends about the middle portion 12D of the shaft 12 and between the process fluid P at the first portion 12A of the shaft 12 and the external environment E at the second portion 12B of the shaft 12.

Figure 2:
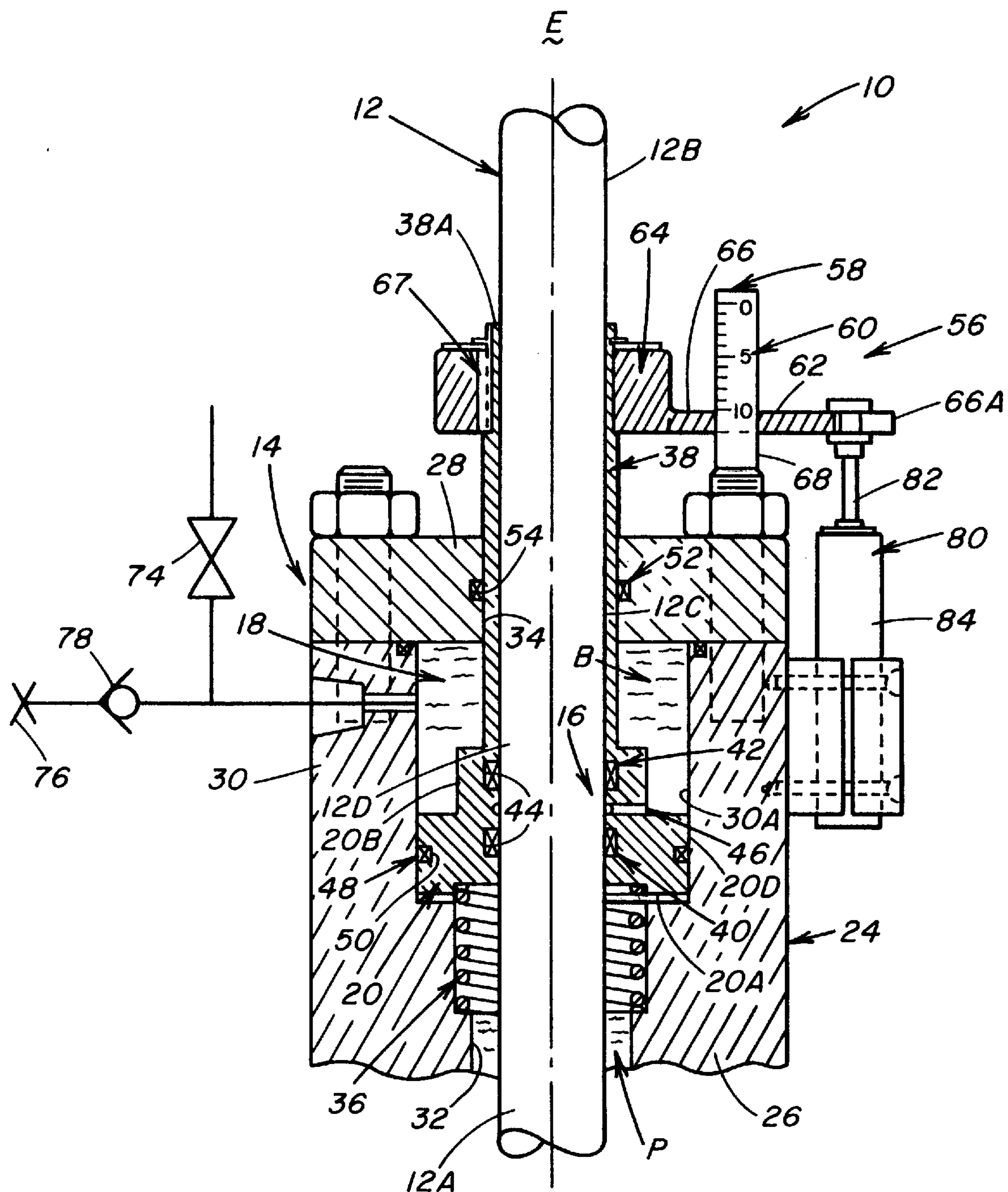
FIG. 2 is a longitudinal sectional view of the integrated apparatus similar to that of FIG. 1 except that an interior compression spring is shown employed by the integrated apparatus.
Figure 3:
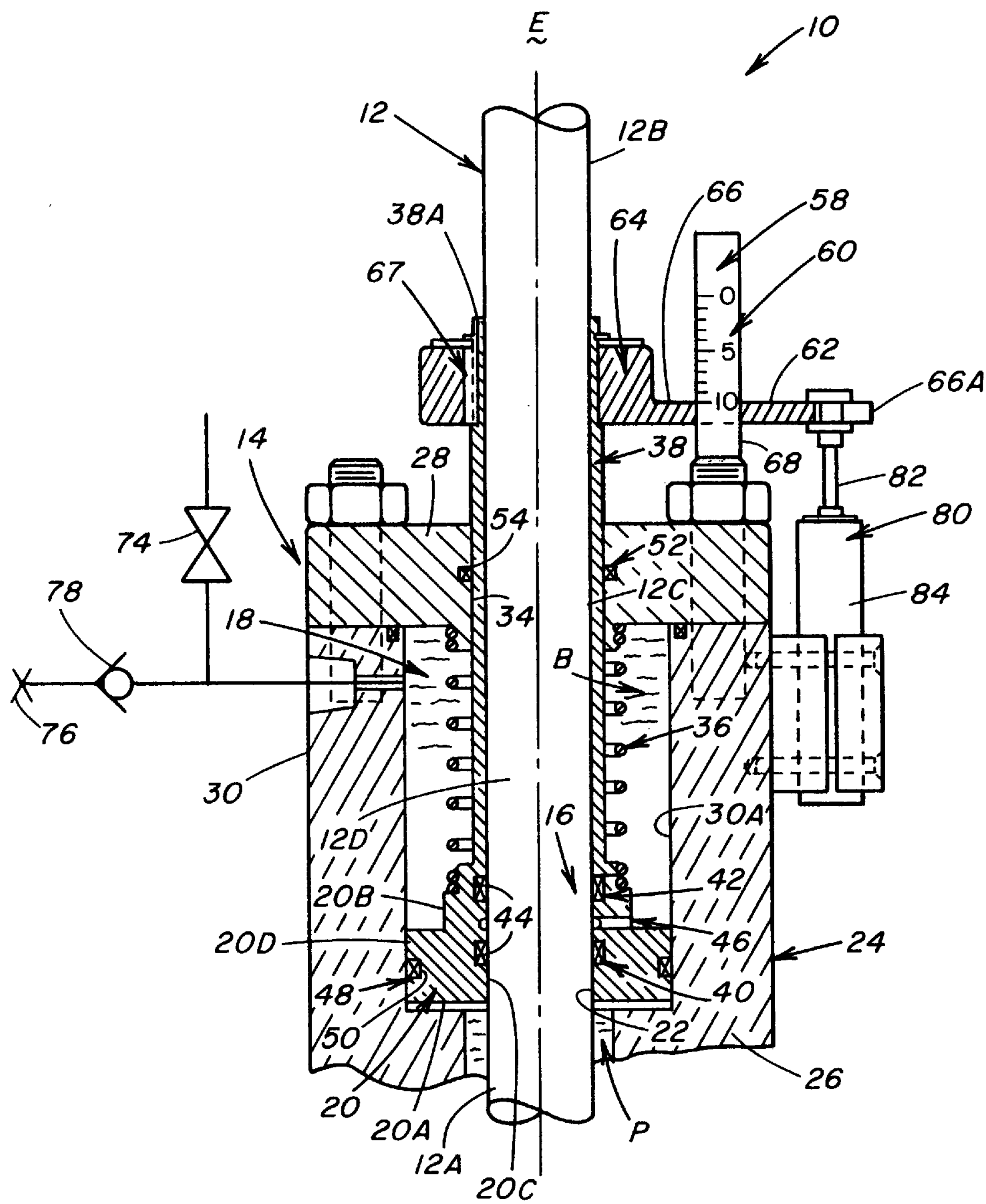
FIG. 3 is a longitudinal sectional view of the integrated apparatus similar to that of FIG. 1 except that an interior extension spring is shown employed by the integrated apparatus.
Figure 4:
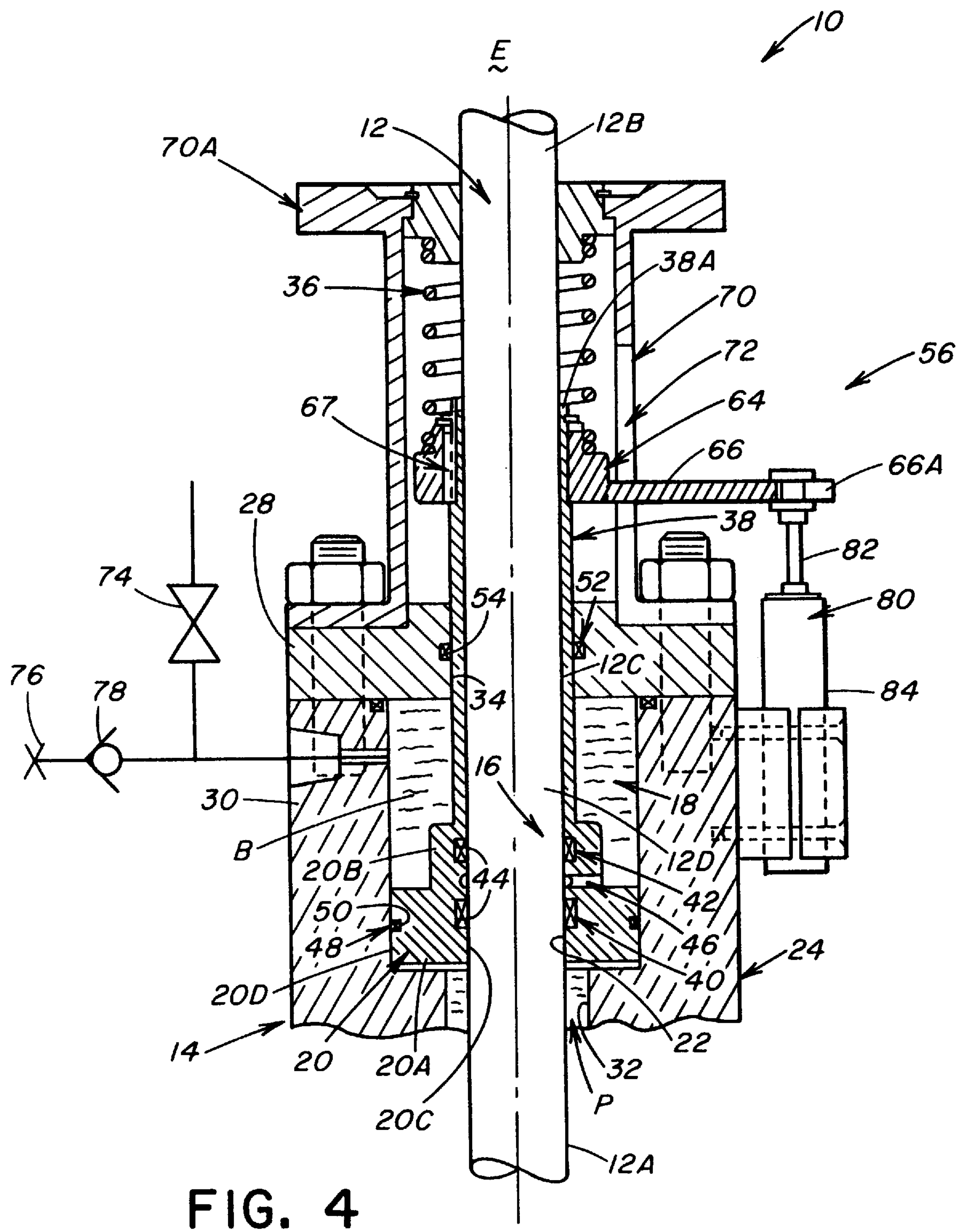
FIG. 4 is a longitudinal sectional view of the integrated apparatus similar to that of FIG. 1 except that an exterior extension spring is shown employed by the integrated apparatus.

The pressure intensifier 20 also includes an elongated spring 36 for imposing a bias force on the piston 20. The spring 36 surrounds the shaft 12 and can be disposed at any one of the different positions seen in FIGS. 1 to 4. In FIG. 1, the spring 36 is a compression type located outside of the chamber 18 adjacent to the other end wall 28 of the enclosure 24. In FIG. 2, the spring 36 is also a compression type located outside of the chamber 18 adjacent to the one end wall 26 of the enclosure 24 and the outer end 20A of the piston 20. In FIG. 3, the spring 36 is an extension type located inside of the chamber 18 between the inner end 20B of the piston 20 and the other end wall 28 of the enclosure 24. In FIG. 4, the spring 36 is also an extension type located outside of the chamber 18 and spaced from the other end wall 28 of the enclosure 24.

The process fluid P at the first pressure presses through the one opening 32 in the one end wall 26 of the enclosure 24 and against an outer side 20A of the annular piston 20 in the direction toward the other end wall 28 of the enclosure 24. The spring 36 being mounted in any one of the illustrated positions relative to the enclosure 24 exerts a force on the piston in the same direction as the pressure of the process fluid P. Therefore, the pressure of the process fluid P and the force of the spring 36 together pressurize the barrier fluid B in the chamber 18, between the piston 20 and the other end wall 28 of the enclosure 24, to the second pressure slightly above the first pressure of the process fluid P, thus preventing leakage of process fluid P along the shaft 12 from the one end wall 26 to the other end wall 28 of the enclosure 24 to the external environment E. The establishment of the second pressure of the barrier fluid B, for instance about 5 to 10 percent, above the first pressure of the process fluid P is a result of the ratio of effective surface areas of the inner end 20B of the annular piston 20, the force of the spring 36 and the volume of an elongated hollow sleeve 38 connected to the inner end 20B of the annular piston 20 and movable with the annular piston 20 and protruding therefrom along the shaft 12 and from the chamber 18 at the other end wall 28 of the enclosure 24.

The sealing arrangement 16 of the apparatus 10, more specifically, includes first and second annular-shaped sealing elements 40, 42, such as packing seals, seated within spaced-apart annular recesses 44 formed in the inner peripheral surface 20C of the annular piston 20. Thus, the first and second sealing elements 40, 42 are axially spaced apart from one another along the third portion 12D of the shaft 12 and define the dual seals mentioned earlier. The annular piston 20 also has an elongated pressure port 46 defined therethrough and extending between the annular sealing elements 40, 42 for communicating barrier fluid pressure between the chamber 18 and the external surface 12C of the shaft 12. Thus, the two annular sealing elements 40, 42 are separated by the pressure port 46 and chamber 18 that surrounds the shaft 12 so that the first sealing element 40 seals the barrier fluid B from leaking into the process fluid P and the second sealing element 42 seals the barrier fluid B from leaking into the external environment E which, in turn, because of the greater pressure of the barrier fluid B over the process fluid P prevents leakage of the process fluid P into the barrier fluid B and into the external environment E.

The pressure intensifier 14 also includes an annular-shaped external sealing element 48 seated in an annular recess 50 formed in outer peripheral surface 20D of the annular piston 20 which seals the piston 20 against an interior surface 30A of the annular sidewall 30 of the enclosure 24. The pressure intensifier 14 further includes an annular-shaped rod sealing element 52 seated in an annular recess 54 formed in the other end wall 28 of the enclosure 24 within the opening 34 through the end wall 28. The annular sealing element 52 seals about the piston sleeve 38 extending through the opening 34 of the enclosure 24 so as to prevent barrier fluid B from leaking about the sleeve 38 to the external environment E.

Referring to FIGS. 1 to 6, the integrated apparatus 10 also includes a visual barrier fluid volume indicator mechanism, generally designated 56, being coupled to the piston 20 and responsive to movement of the piston 20 for visually indicating the position of the piston 20 and the volume of barrier fluid B contained in the chamber 18. The visual indicator mechanism 56 includes a stationary member 58 with a visual measurement scale 60 thereon having a plurality of symbols ranging from full to empty and from zero to ten and graduations associated with the symbols. The visual indicator mechanism 56 also includes an indicator member 62 movable with the piston 20 of the pressure intensifier 14 such that the indicator member 62 moves relative to the stationary member 58 so as to align with one of the graduations and symbols on the scale 60 that corresponds to the volume of barrier fluid B contained in the chamber 18 of the pressure intensifier 14.

More particularly, the indicator member 62 includes an anti-rotation collar 64 and a position indicator plate 66. The anti-rotation collar 64 is fixedly attached by a coupling key 67 to an outer end 38A of the sleeve 38. The position indicator plate 66 supported in a generally cantilevered fashion from one side of the anti-rotation collar 64 projects outwardly therefrom in a generally orthogonal relationship to the sleeve 38 and shaft 12. As shown in FIGS. 1 to 3, the annular piston 20 and sleeve 38, the anti-rotation collar 64 and the position indicator plate 66 are prevented from rotating about the shaft 12 by means of the stationary member 58 which can take the form of an anti-rotation pin 68 screwed into the enclosure 24 and positioned upright across the path of the position indicator plate 66. Thus, the piston 20 with the sleeve 38, the anti-rotation collar 64 and the position indicator plate 66 are able to move axially along the shaft 12, depending upon the volume of barrier fluid B in the chamber 18, but cannot rotate about the shaft 12. The visual measurement scale 60 used for measuring the volume of barrier fluid B in the chamber 18 is marked on the anti-rotation pin 68.

A somewhat different arrangement that prevents rotation is shown in FIG. 4. An extension 70 on the enclosure 24 has an elongated slot or window 72 defined in a side of the extension 70. The position indicator plate 66 extends through the window 72 of the extension 70 so as to thereby prevent rotation of the piston 20 with the sleeve 38, the anti-rotation collar 64 and the position indicator plate 66. The visual measurement scale 60 is now marked on the outside of the extension 70, which now functions as the stationary member 58, alongside the window 72 for measuring the volume of the barrier fluid B in the chamber 18.

As mentioned above, the spring 36 is either a compression or extension type and is located inside or outside of the enclosure 24. In FIGS. 1 and 4, the spring 36 is located between the anti-rotation collar 64 and either the other end wall 28 of the enclosure 24 in FIG. 1 or the outer end 70A of the enclosure extension 70 in FIG. 4. The spring bias force overcomes seal friction and develops a small residual pressure in the chamber 18 when the process fluid pressure is zero, helping the first and second sealing elements 40, 42 to seat and seal better at lower pressure. The bias force of the spring 36 also prevents the pressure of the barrier fluid B in the chamber 18 from dropping below the pressure of the process fluid P which may occur when the shaft 12 is moving toward the process fluid P. The friction from the sealing elements 40, 42 carries or pulls along the piston with the shaft 12, which would cause the pressure of the barrier fluid B to drop below the pressure of the process fluid P if the spring bias force was not utilized.

To fill the chamber 18 of the enclosure 24 with barrier fluid B, the chamber 18 is first evacuated using a vacuum pump connected to a purge valve 74. After the chamber 18 has been evacuated, the purge valve 74 is turned off. A barrier fluid supply pump (not shown) is connected to a fill coupling 76 and then is operated to fill the chamber 18. Another method of filling the chamber 18, not requiring a vacuum pump, can be used when the barrier fluid is a liquid. The chamber 18 is first filled using the fill coupling 76 connected to the barrier fluid supply pump. Then, the purge valve 74 is opened to bleed off gas trapped in the chamber 18. This process is repeated until all gas is purged from the chamber 18. A fill check valve 78 maintains the barrier fluid pressure after the chamber 18 has been filled.

Figure 5:
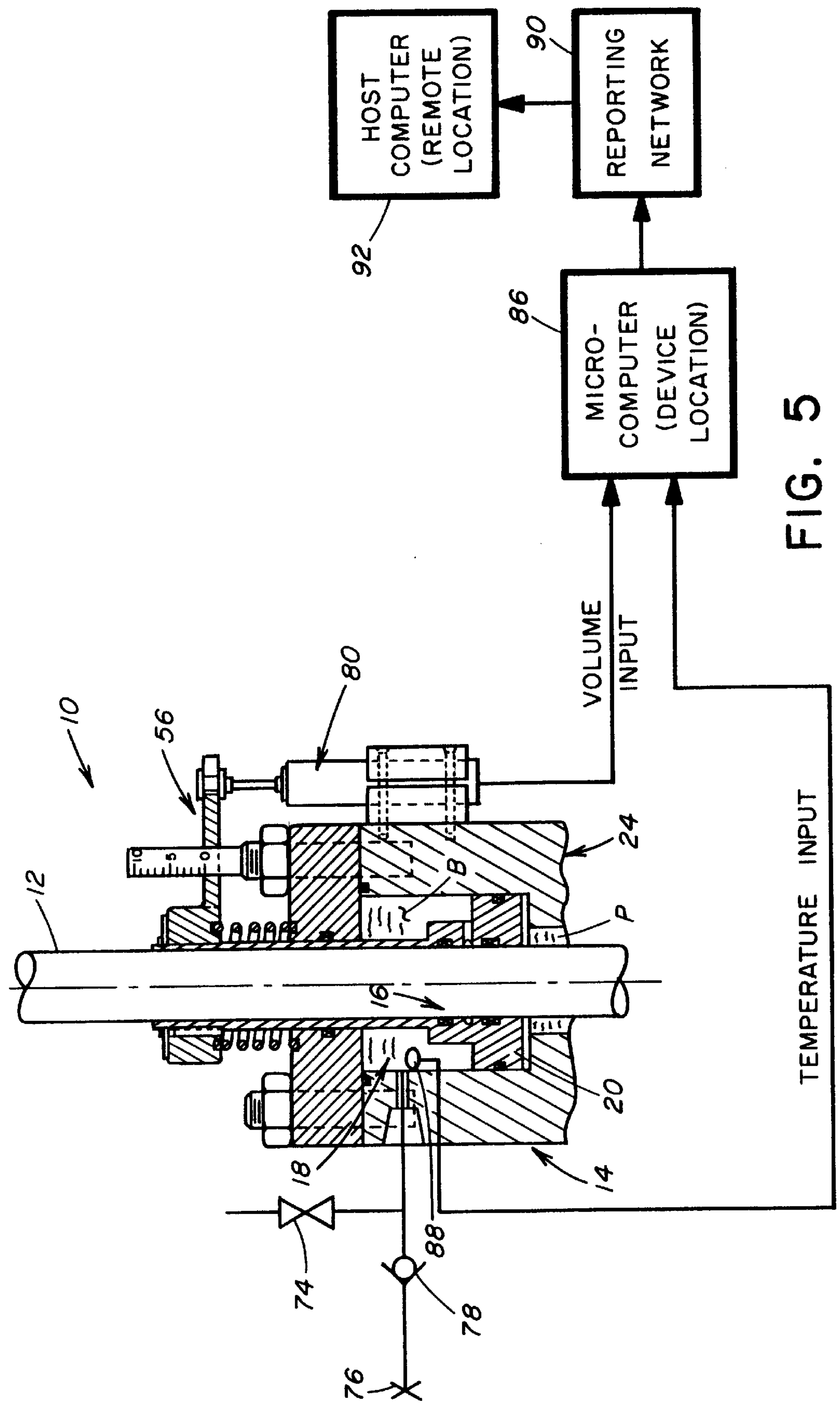
FIG. 5 is a longitudinal sectional view of the integrated apparatus as shown in FIG. 1 along with a microcomputer based data communication system.

Referring now to FIG. 5, there is shown an optional installation configuration where an automated form of monitoring of leakage is desired. A linear transducer 80 is mounted to a side of the annular sidewall 30 of the enclosure 24 and has a linearly reciprocal rod 82 being connected to an outer end 66A of the position indicator plate 66. The rod 82 moves relative to (extends or retracts from) a cylinder 84 of the transducer 80 in response to axial movement of the piston 20, sleeve 38, anti-rotation collar 64 and position indicator plate 66. The linear transducer 80 generates electrical signals or data that electronically locates the position of the annular piston 20 within the chamber 18 and thereby determines the volume of the barrier fluid therein. The electrical data are relayed as inputs to a microcomputer 86 at the location of the operational device. Input data from a temperature transducer 88 disposed in the chamber 18 also is relayed to the microcomputer 86. The data from these two transducers 80, 88 are stored in the memory of the microcomputer 86 along with the date and time when the data was taken. If the microcomputer 86 is equipped with a display, an average leakage rate can be calculated and displayed at that location. A reporting network 90 connects with the microcomputer 86 to a host computer 92, allowing the transfer of data to and from the microcomputer 86. At the host computer's request, the transducer data, date and time data, and leakage calculations from the microcomputer 86 are transferred to the host computer 92. The data sent to the host computer 92 for a particular operational device is stored in a maintenance database and is used by the software of the host computer 92 to perform maintenance analyses, including forecasting economic seal replacement dates and generating maintenance reports that determine maintenance priorities.

Figure 6:
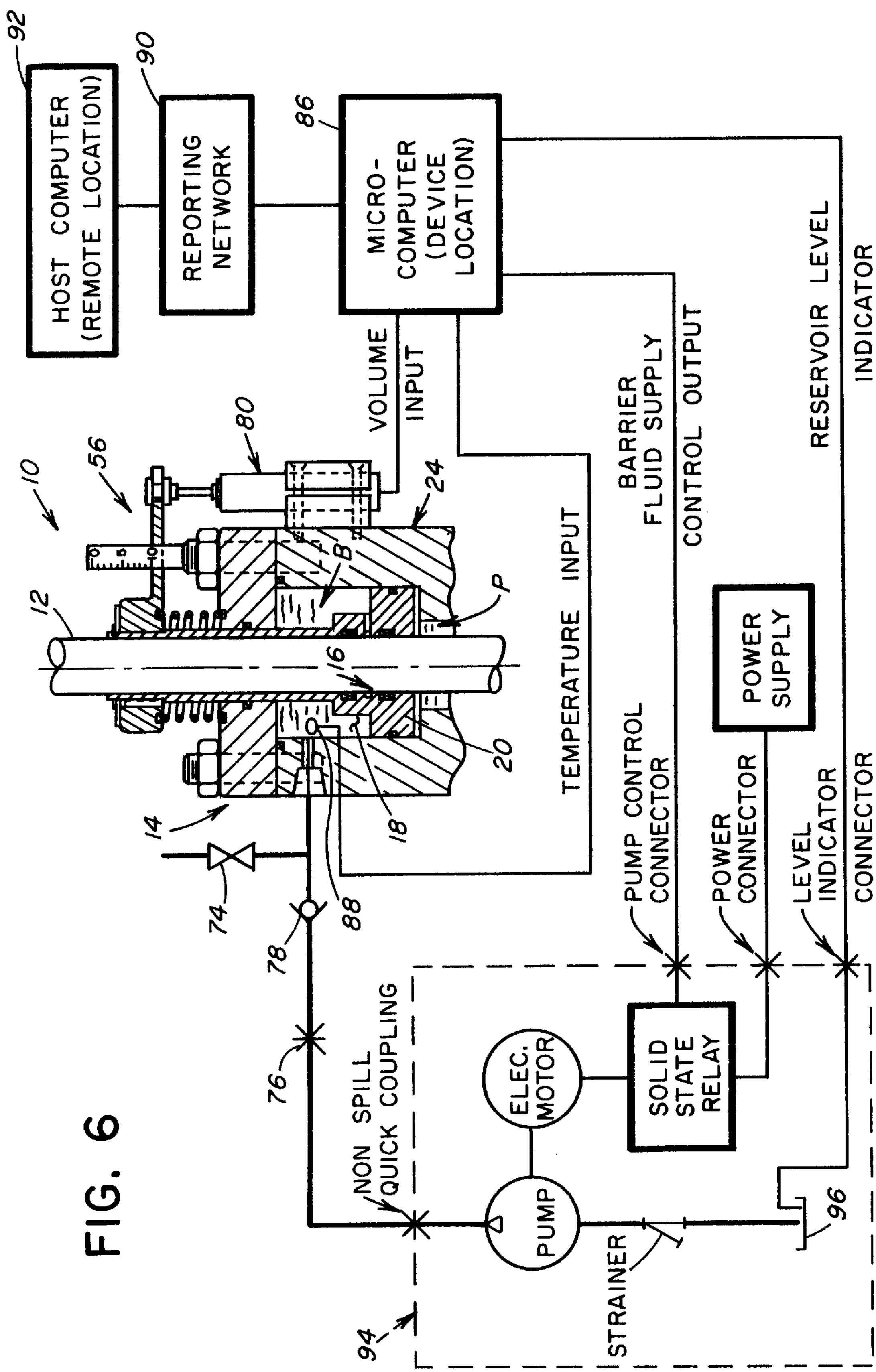
FIG. 6 is a longitudinal sectional view of the integrated apparatus as shown in FIG. 1 along with the microcomputer based data communication system and a removable barrier fluid supply.

Referring to FIG. 6, there is shown a removable barrier fluid supply 94 connectable to the enclosure 24. When the sealing elements 40, 42 in the chamber 18 begin to leak, the barrier fluid leakage may be slow or intermittent and the particular operational device may not need immediate attention. However, if the device begins to leak barrier fluid at a high rate, the leakage must be controlled or there is a danger of process fluid leakage. To avoid expensive unscheduled maintenance, the removable barrier fluid supply 94 can be connected to the enclosure 24 on a temporary basis until the device can be resealed during scheduled maintenance. The microcomputer 86 turns on the removable barrier fluid supply 94 and fills the chamber 18 when the volume of barrier fluid therein becomes too low. The microcomputer 86 also monitors the fluid level of the barrier fluid reservoir 96. If the fluid level of the reservoir 96 is low, the microcomputer 86 notifies the host computer 92 so that the reservoir 96 can be filled manually. Since the barrier fluid has been selected so as not to harm the environment, there is no concern about release or spillage of barrier fluid. When scheduled maintenance allows, the removable barrier fluid supply 94 is removed and the device is resealed.

Figure 7:
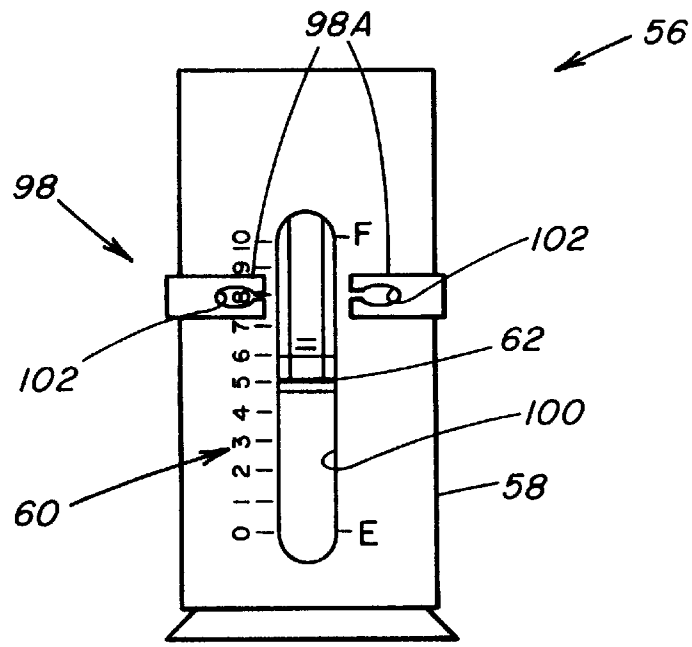
FIG. 7 is a front elevational view of a second exemplary embodiment of a visual barrier fluid volume indicator mechanism of the present invention shown employed in combination with a pressure intensifier.
Figure 8:
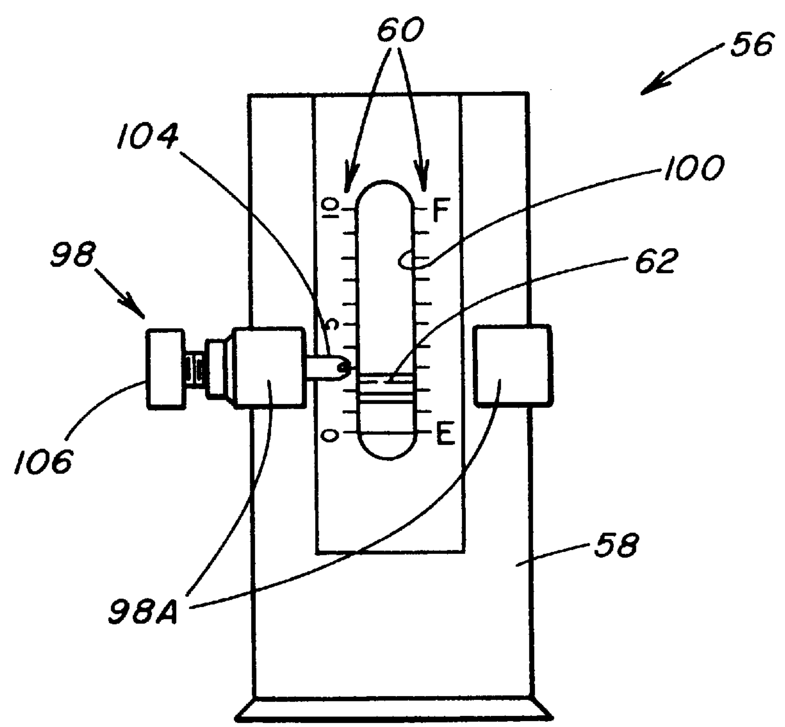
FIG. 8 is a front elevational view of a third exemplary embodiment of the visual indicator mechanism shown employed with a pressure intensifier.

Referring to FIGS. 7 and 8, there is illustrated additional embodiments of the visual barrier fluid volume indicator mechanism 56 which can be used with the pressure intensifier 14 of the integrated apparatus 10 described above and also with the control apparatus disclosed in the aforementioned U.S. patents granted to the inventor herein. In addition to including the stationary member 58, the visual measurement scale 60 on the stationary member 58, and the indicator member 62, these embodiments of the visual indicator mechanism 56 further include a manually adjustable position indicator 98 in the form of a C-shaped band which extends snugly about the stationary member 58 and has a pair of opposite ends 98A spaced apart from one another at the location of a window 100 in the stationary member 58. The indicator member 62 can be seen through the window 100 and the visual measurement scale 60 is marked alongside the window 100 for measuring the volume of the barrier fluid in the chamber 18. In the embodiment of FIG. 7, the manual position indicator 98 has a slot 102 in each of its opposite ends 98A through which an operator can observe the respective symbol (number) on the visual measurement scale 60 with which the manual position indicator 98 is aligned. The manual position indicator 98 snugly fits about the stationary member 58 so that it will remain at any position to which it has been slidably moved and placed along the stationary member 58. In the embodiment of FIG. 8, the manual position indicator 98 has a pointer 104 attached to and extending from one of its opposite ends 98A. The pointer 104 can be aligned with a given symbol on the scale 58 upon slidably moving the indicator 98 along the stationary member 58 to the desired position. The manual position indicator 98 in FIG. 8 also has a set screw 106 which can be tightened to retain the indicator 98 at the desired position and loosened for moving the indicator 98.

The purpose of the manual position indicator 98 in both embodiments is to mark the position of the barrier fluid volume manually so that a later position of the movable indicator member 62 of the visual indicator mechanism 56 can be compared to its earlier position now marked by the manual position indicator 98. In such manner, a change of barrier fluid volume over time can be visually noted and "manually" measured.

In conclusion, the integrated assembly 10 primarily functions to prevent process fluid P from leaking into the external environment E by using a higher pressure barrier fluid B and to extend the service life of the barrier fluid sealing arrangement 16 by monitoring the sealing arrangement for leakage. Secondary functions which can be associated with the integrated assembly 10 include calculating barrier fluid leakage volume, reporting leakage time and date information over the reporting network 90, forecasting economic seal replacement dates, and generating maintenance reports that determine maintenance priorities on the host computer 92.

It is thought that the present invention and many of its advantages will be understood from the foregoing description and it will be apparent that various changes may be made thereto without departing from the spirit and scope of the invention or sacrificing all of its material advantages, the forms hereinbefore described being merely preferred or exemplary embodiments thereof.

What is claimed is:

1. A barrier fluid sealing apparatus, comprising:

(a) an elongated shaft of an operational device, said shaft having a first portion in communication with a process fluid at a first pressure and a second portion axially displaced from said first portion being in communication with an external environment;

(b) a pressure intensifier having an annular shape so as to surround and extend along said shaft, said pressure intensifier defining a chamber extending about said shaft between the process fluid and the external environment and containing barrier fluid therein, said pressure intensifier having an annular piston surrounding and movable relative to said shaft and disposed in said chamber in communication with the process fluid and barrier fluid for enabling maintenance of the barrier fluid in said chamber at a second pressure above the first pressure of the process fluid; and (c) a sealing arrangement having an annular shape and mounted to said annular piston and surrounding said shaft so as to define a seal between said shaft and piston such that said pressure intensifier and sealing arrangement cooperate to prevent leakage of process fluid along said shaft to the external environment.

2. The apparatus of claim 1 wherein said piston is disposed in communication with the process fluid at an outer end of said piston and in communication with the barrier fluid at an inner end of said piston.

3. The apparatus of claim 1 wherein said sealing arrangement includes a pair of annular sealing elements axially spaced apart from one another along said shaft.

4. The apparatus of claim 3 wherein said piston has a pressure port defined between said annular sealing elements for communicating barrier fluid pressure between said chamber and said shaft.

5. The apparatus of claim 1 wherein said pressure intensifier includes an enclosure having a pair of opposite spaced end walls and an annular sidewall extending between and connected with the opposite end walls so as to define said chamber therebetween within said enclosure.

6. The apparatus of claim 5 wherein said enclosure has a pair of opposite openings each formed through a respective one of the opposite end walls such that said shaft extends through said enclosure and beyond said openings of said end walls thereof and through said chamber of said enclosure.

7. The apparatus of claim 1 wherein said pressure intensifier further includes an elongated spring biasing said annular piston so as to assist said piston in maintaining the second pressure of the barrier fluid above the first pressure of the process fluid.

8. The apparatus of claim 1 wherein said pressure intensifier further includes an elongated sleeve connected at one end to said annular piston and movable therewith and protruding therefrom along said shaft and through and from said chamber to a portion for connecting to a barrier fluid volume indicator mechanism to render the indicator mechanism responsive to the movement of said piston.

9. The apparatus of claim 1 wherein said pressure intensifier further includes an elongated sleeve connected at one end to said annular piston and movable therewith and protruding therefrom along said shaft and through and from said chamber to a portion for connecting to a linear transducer for measuring the movement of said piston.

10. The apparatus of claim 1 further comprising:

a barrier fluid supply connectable to said enclosure for selectively filling said chamber with barrier fluid.

11. The apparatus of claim 1 further comprising:

a linear transducer coupled to said annular piston for generating electrical data that electronically locates the position of said annular piston within said chamber and thereby determines the volume of barrier fluid in said chamber.

12. The apparatus of claim 11 further comprising:

a temperature transducer located in said chamber and generating electrical data representing the temperature of the barrier fluid in said chamber; and a microcomputer receiving and storing the electrical data generated by said linear transducer and temperature transducer.

13. The apparatus of claim 1 further comprising:

a visual barrier fluid volume indicator mechanism coupled to said piston and being responsive to movement of the piston for visually indicating the volume of barrier fluid in said chamber.

14. The apparatus of claim 13 wherein said visual indicator mechanism includes:

a stationary member with a measurement scale having a plurality of symbols thereon ranging from about full to about empty; and an indicator member being movable with said piston of said pressure intensifier along said shaft so as to align with one of said symbols on said scale which corresponds to the volume of barrier fluid contained in said chamber of said pressure intensifier.

15. The apparatus of claim 14 wherein said visual indicator mechanism further includes a manually adjustable position indicator which extends at least partially about and is slidably movable along said stationary member to manually align said position indicator with a given symbol on said scale for manually retaining a barrier fluid volume measurement to compare with a later measurement by said indicator member.

16. The apparatus of claim 15 wherein said visual indicator mechanism further includes an adjustable fastener on said manually adjustable position indicator for releasably attaching said position indicator at a desired position along said stationary member.

* * * * *